US005674335A

United States Patent [19]

Aman et al.

[11] Patent Number: 5,674,335

[45] Date of Patent: Oct. 7, 1997

[54] AUTOMATED END LABELER SYSTEM

[76] Inventors: James A. Aman, 134 Bridle View Way, Souderton, Pa. 18964; William R. Haller, 425 Brighton St. #403, Bethlehem, Pa. 18015

[21] Appl. No.: 635,051

[22] Filed: Apr. 19, 1996

Related U.S. Application Data

[63] Continuation of Ser. No. 369,509, Jan. 6, 1995, abandoned.

[51] Int. Cl.$^6$ .......... B32B 31/00

[52] U.S. Cl. .......... 156/64; 156/363; 156/364; 209/3.3; 209/517; 209/524; 364/560

[58] Field of Search .......... 156/64, 350, 360, 156/362, 363, 364; 209/3.3, 517, 524, 576, 577; 364/488, 489, 490, 556, 559, 560, 561, 562, 563

[56] References Cited

U.S. PATENT DOCUMENTS

| | | | |
|---|---|---|---|
| 2,586,835 | 2/1952 | Leger | 156/DIG. 48 |
| 3,222,242 | 12/1965 | Ingalls et al. | 156/DIG. 48 |
| 3,955,073 | 5/1976 | Carew et al. | 235/151.32 |
| 4,276,112 | 6/1981 | French et al. | 156/360 |
| 4,281,765 | 8/1981 | Brazell et al. | 209/576 |
| 4,321,103 | 3/1982 | Lindstrom et al. | 156/364 X |
| 4,427,484 | 1/1984 | Cameron, Jr. et al. | 156/363 X |
| 4,543,766 | 10/1985 | Boshinski | 53/64 |
| 4,784,714 | 11/1988 | Shibata | 156/360 X |
| 4,891,088 | 1/1990 | Svyatsky | 156/364 X |
| 4,927,486 | 5/1990 | Fattal et al. | 156/351 |
| 5,078,816 | 1/1992 | Ratermann | 156/64 |
| 5,141,572 | 8/1992 | Gerber | 156/362 X |
| 5,218,550 | 6/1993 | Kato | 364/559 X |
| 5,227,985 | 7/1993 | DeMenthon | 364/559 |
| 5,230,765 | 7/1993 | Weiselfish et al. | 156/350 |
| 5,232,539 | 8/1993 | Carpenter et al. | 156/360 |
| 5,254,189 | 10/1993 | Hirobe et al. | 156/360 X |
| 5,280,436 | 1/1994 | Kubota et al. | 364/559 |
| 5,307,292 | 4/1994 | Brown et al. | 364/564 |
| 5,307,294 | 4/1994 | Aman et al. | 364/560 |
| 5,425,823 | 6/1995 | Woodside, III | 156/360 X |
| 5,472,552 | 12/1995 | Speranza et al. | 156/351 |

FOREIGN PATENT DOCUMENTS

| | | | |
|---|---|---|---|
| 600083 | 6/1960 | Canada | 209/517 |
| 1033335 | 6/1978 | Canada | 209/3.3 |

*Primary Examiner*—David A. Simmons
*Assistant Examiner*—Paul M. Rivard

[57] ABSTRACT

An automatic label applicator includes means for scanning a group of touching objects to determine their unique coordinates, and means responsive to the coordinates for automatically applying labels to the objects. A robotic arm is controllably movable in horizontal and vertical directions to align the applicator with individual objects disposed in a stack of objects.

16 Claims, 7 Drawing Sheets

AUTOMATED END LABELER SYSTEM

This application is a continuation of application Ser. No. 08/369,509, filed Jan. 6, 1995 now abandoned.

FIELD OF INVENTION

The present invention relates to electronic systems for labeling bundled lumber.

DESCRIPTION OF PRIOR ART

Lumber is most often transferred from primary manufacturer, to secondary manufacturer, to wholesaler and finally to retailer in bundled units. These units typically consist of lumber which is at least the same species, grade and thickness. When leaving the primary manufacturer, i.e. a sawmill, the units are of both random width and length. The secondary manufacturer, e.g. a kiln and/or surfacing yard, will usually regrade and repack the original units prior to shipping them to the wholesaler. As an added service, they may also sort the lumber into fixed width, two length packs. The wholesaler may then repackage these units into fixed width and fixed or two length packs, if this has not already been done. Hence, each step in this process will usually involve at least the repackaging of the bundled units.

The wholesaler may then sell these bundled units to other wholesalers or retailers. With the growing popularity of large retail home centers, many wholesalers find themselves providing additional services just for the home center in an effort to help these large retailers cut their processing costs. One such service is to individually label each board in each unit in such a way that the boards may be handled using bar code readers at checkout counters. The current state of the art in this area are computer systems which generate small bar coded labels that can be fed into hand help labeling devices. These devices are used by yard men to individually label each board. This process has several drawbacks including the cost of paying for human labor to actually apply each label, the potential to mislabel individual boards and the time required to conduct the entire process.

One of the reasons that this is a difficult function to automate is that each bundled unit may be constructed differently from any other unit. This construction refers to the number of boards on each course (or layer) of the unit as well as the number of total comes. Furthermore, while each board is typically of the same thickness, they may have varying widths and or lengths within an individual unit, let alone across several units. Heretofore, the ability of recognizing the various sizes of individual boards within each unit as well as the ability to effectively apply the proper label to each board by controllably moving a label application device, has been best met by the human visual and hand-eye coordination systems.

The present inventors have been granted U.S. Pat. No. 5,307,294 for their invention of the Automated End Tally System which is capable of automatically determining the three dimensional end topology of any unit of lumber. This system is further capable of determining each unit's "end tally" based upon each unit's end topology. Given the teachings of this prior art and the current state of the art in robotics and label generating systems, it is now possible to create an entirely automated system capable of recognizing the exact location of individual boards within a bundled unit of lumber, of generating unique labels for each recognized board and of subsequently applying each label to each appropriate board. Such a system will overcome the current problems of costly human labor and potentially mislabelled boards while greatly reducing the time required to label an entire unit.

An additional problem is faced by wholesalers who re-manufacture their lumber prior to resale. Specifically, in the case where the wholesaler receives distinct units of like lumber from multiple mills and then regrades, resorts and/or re-manufactures (e.g. cuts) these units in such a way that lumber from more than one mill gets co-mingled when repacking new processed units, a problem then occurs in that the wholesaler can no longer track quality and yield by mill. This is because like lumber from one mill is indistinguishable from that of another mill and can only be tracked if it remains in separate distinct units.

A similar but different problem faces wholesalers that regrade rejected plywood. In this case each rejected plywood unit is purchased at a fixed price per sheet. Every piece of each unit will be examined and then reclassified into at least two different grades of rejects. New units are constructed from the pieces of the original units. It is desirable to know the actual cost of each new regraded unit which would be based upon the actual cost of each of the pieces making up the unit, Since these pieces have no distinguishing markings it is not possible to differentiate them for costing purposes. Proposals have been made to individually tug each piece when the original units are received so that this tag may then serve to uniquely identify the plywood in the new regraded units. This proposal has similar drawbacks to the current board end labeling techniques including the cost of paying for human labor to actually apply each label as well as the time required to conduct the entire process. In addition to these problems, plywood sheets may be as thin as one quarter of an inch which is very little room on which to apply a label and their end surfaces may not be smooth enough to hold the label depending upon the adhering technique employed.

Note that the Automated End Tally System as patented is fully capable of creating end topologies and tally counts for units of plywood by using the same techniques as applied to units of lumber. Furthermore, the end topologies of either lumber or plywood are unique to each unit and therefore must be retrievable based upon some unit identification means. The present inventors currently have pending under application Ser. No. 08/263,090 an Automated Lumber Unit Tracking System which operates to uniquely track the whereabouts in the lumber yard of each and every unit. Hence, as units are moved by transporting vehicles such as a fork lift, they are immediately identified to an office computer system which may then recall each unit's end topology and tally count information which was previously determined by the end tally system. This topology information is extremely important to any automated system for labeling boards in that it essentially provides the same information determined by the human visual system to direct the hand-eye coordination.

As can be seen by those familiar with lumber processing, each of the above stated three problems are of a similar nature and stem from one fundamental problem. Namely, individual pieces of lumber (or plywood) are indistinguishable from other pieces of at least a similar specie, grade, thickness, width and length. And while they arrive at the wholesalers yard conveniently segregated into bundled units which can easily be associated with both the producing mill and the purchase cost, while at the yard, these units are broken and repackaged with lumber from other mills, thereby loosing all identity. Given the current state of the art in polymer and laser technologies, it is possible to individually mark each board within each unit when it arrives at the wholesaler. Such demarcation then allows the wholesaler to process these boards and then to ultimately construct new units out of boards from one or more mills while still being able to accurately track the original vendor and cost by each piece. This then provides an accurate means of tracking yield by vendor and the actual cost of each new mixed unit. This same technique can also be applied to uniquely identifying (e.g. bar coding) boards in units about to be shipped to large retailers as opposed to using robotic devices to apply individual labels mimicking the current human based methods. Such a system will overcome the current problems of costly human labor and the time required to label an entire unit while also providing the advantages of working with thinner material which might have poor end surfaces on which to attach labels, such as plywood. And finally, labels are currently attached by means of a staple since forms of gluing would not be as weather and handling resistant. This staple could prove extremely dangerous if it was encountered by any of the wholesaler's re-manufacturing equipment. Such a problem would not exist using demarcated polymers.

OBJECTS AND ADVANTAGES

Accordingly, the objects and advantages of the present invention are:

1. to provide a system for labeling individual boards within a bundled unit of lumber without the aid of a human;

2. to provide a system for labeling boards with a minimum errors;

3. to provide a system which can perform at the highest possible throughput by labeling boards in the shortest possible time;

4. to provide a system capable of working with current practices of stapling individual labels to individual boards;

5. to also provide a system capable of working without current practices of stapling individual labels to individual boards where the surfaces are not conducive or the staple could present subsequent problems;

6. to also provide a system with the ability to track at least the mill and cost of individual boards even as they are co-mingled with other boards to form new bundled units after processing;

Further objects and advantages are to provide a system with a minimum of moving parts capable of withstanding a large variation of weather conditions. Still further objects and advantages of the present invention will become apparent from a consideration of the drawings and ensuing description.

SPECIFICATION OF THE PREFERRED EMBODIMENT

Figure 1:
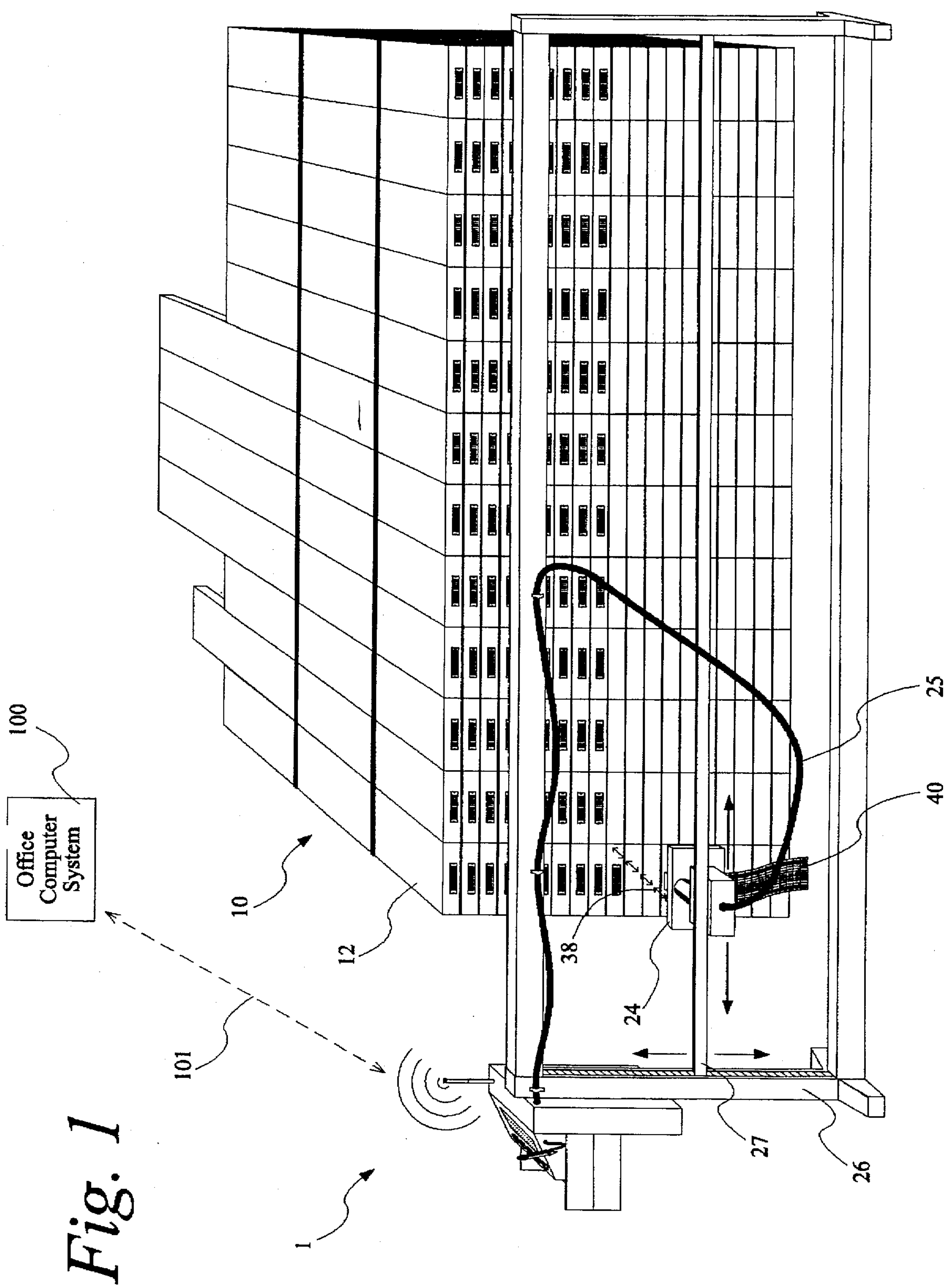
FIG. 1 is a perspective diagram of the preferred embodiment of the Automated End Labeler System, which is a modified version of the Automated End Tally System, that is capable of uniquely generating appropriate labels and controllably moving a robotic label applicator in order to automatically apply each label to the end of each appropriate board.

As shown in FIG. 1, the preferred embodiment of the Automated End Labeler System 1 includes scanning unit with robotic label applicator 24, which is attached to and capable of controlled horizontal movement on horizontal arm 27. Arm 27 is further attached to and capable of controlled vertical movement on stand 26. Scanning unit with robotic label applicator 24 emits focused incident scanning energy beam 38 and receives the reflection of this beam off the end of lumber unit 10. Labels 40 are automatically fed through and printed by unit 24 which attaches individually printed labels 40 to the end surfaces of each individual board such as 12, in unit 10. Electrical power and control signals are provided to unit 24 via cable 25. System 1 is in direct communications with Office Computer System 100 via communications link 101.

OPERATION OF THE PREFERRED EMBODIMENT

Figure 2:
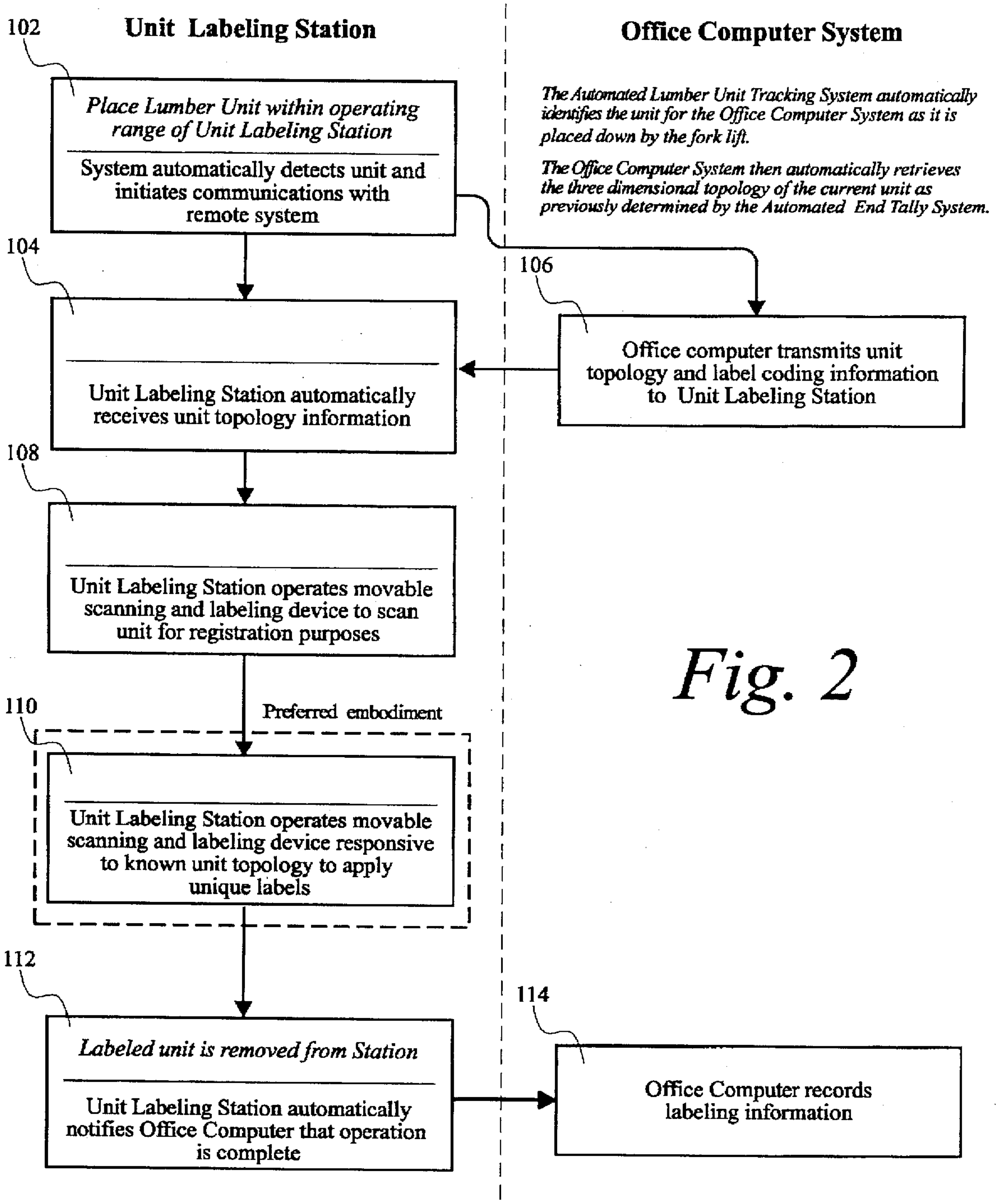
FIG. 2 is a flow diagram of the operation of the preferred embodiment of the present invention.

Referring to FIGS. 1 and 2, it is assumed that unit 10 which is about to be labeled has previously been scanned for end topology and tally count information by a device substantially similar to that described in U.S. Pat. No. 5,307,294 for the Automated End Tally System and that this information currently resides in Office Computer System 100. It is further assumed that unit 10 is being transported to system 1 by a fork lift which is equipped in accordance with patent application Ser. No. 08/263/090 for an Automated Lumber Unit Tracking System, such that when unit 10 is set down in the presence of system 1, step 102, the aforementioned office computer system 100 is automatically notified and subsequently determines the identity and relative coordinates of unit 10. Based upon this information, the office computer system 100 may then transmit to system 1, step 106, the end topology and therefor exact relative locations of each and every board within unit 10, as well as the labeling information for each board, which is received by system 1 via communications link 101, in step 104.

In step 108 of FIG. 2, system 1 controllably directs the movement of scanning unit with robotic labeling applicator 24, which emits focused incident scanning energy beam 38, in a fashion exactly similar to that employed by the Automated End Tally System to direct it's scanning unit. As a result of this directed movement, system 1 is able to determine the relative three dimensional coordinates of unit 10 and especially the relative coordinates of upper left corner board 12. This determination is referred to as the registration of unit 10 to system 1.

In step 110 of FIG. 2, the system 1 controllably directs the scanning unit with robotic labeling applicator 24 from board to board in a left to right, top to bottom sequence. This sequencing is directed in accordance with the previously obtained unit end topology which was provided to system 1 in step 106 by the office computer system 100. Labels 40 are automatically fed through applicator 24 which prints the uniquely identifying information for the next board to be labeled, such as 12. After this, each label is then automatically applied by a robotic extending arm which affixes the label to the appropriate board end.

In step 112 of FIG. 2, the completely labeled unit 10 is removed from system 1 by a transporting vehicle such as a fork lift. Coincident to this, system 1 automatically notifies the office computer 100, via communications link 101, that the labeling process has been completed, which is recorded by system 100 in step 114.

SPECIFICATION OF THE FIRST ALTERNATE EMBODIMENT

Figure 3:
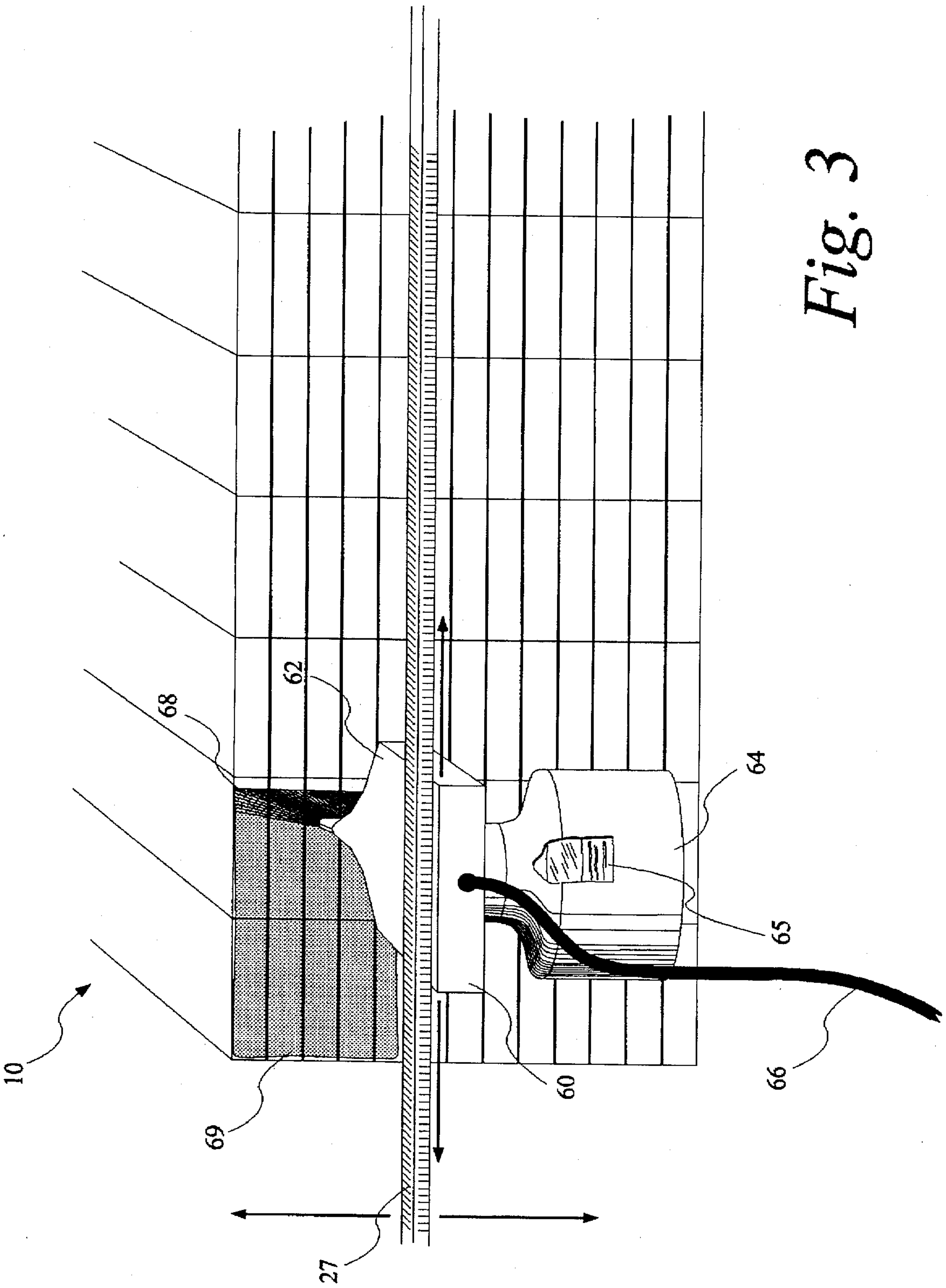
FIG. 3 is a perspective diagram of the first alternate embodiment to the scanning unit with robotic label applicator. The alternate is depicted as an electrostatically controlled wedge shaped material applicator spray head being controllably moved across one entire end of a bundled unit of lumber.
Figure 4:
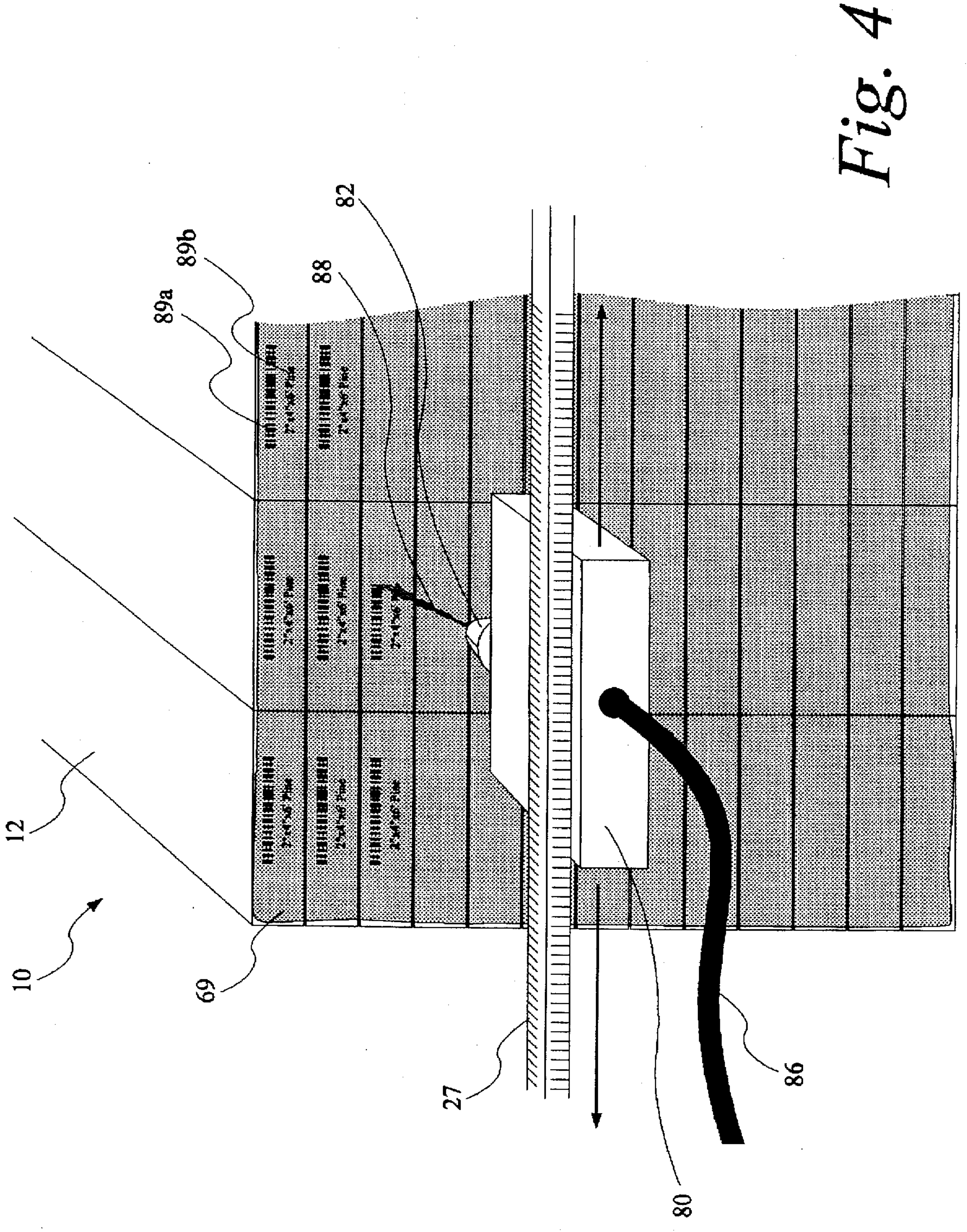
FIG. 4 also pertains to the first alternate embodiment and depicts the demarcation of the material applied to the end of the bundled unit of lumber, which is accomplished by controllably moving an incident focused energy beam across the material's surface.

Referring now to FIGS. 3 and 4, them is shown a first alternate embodiment to label applicator 24. Specifically referring to FIG. 3, there is shown material applicator 60 which is attached to horizontal arm 27 and is capable of controlled horizontal movement along arm 27 in a similar fashion to labeler 24. Applicator 60 further comprises material reservoir 64 which contains optically responsive material 65. Material 65 further consists of an optically responsive substance thoroughly mixed with a conventional latex binder thus forming an optically responsive matrix material. Material 65 is initially optically white in color. Applicator 60 additionally comprises an electrostatically directed wedge shaped spray nozzle 62. Reservoir 64 is in fluid communication with spray nozzle 62 such that material 65 may be forceably ejected from nozzle 62 as spray 68 which then adheres to the board ends of unit 10 forming thin material film 69. Electrical power and control signals are provided to applicator 60 via cable 66.

Referring now specifically to FIG. 4, there is shown laser labeller 80, which is attached to horizontal arm 27 and is capable of controlled horizontal movement along arm 27 in a similar fashion to labeler 24 and applicator 60. Laser labeller 80 further comprises an electronically focused laser 82 which emits focused laser light 84. Focused laser 82 is capable of demarcating the previously dispersed thin material film 69 with both conventional bar code information **89*a* and written text 89*b*. Electrical power and control signals are provided to laser labeller 80 via cable 86**.

OPERATION OF THE FIRST ALTERNATE EMBODIMENT

Figure 5:
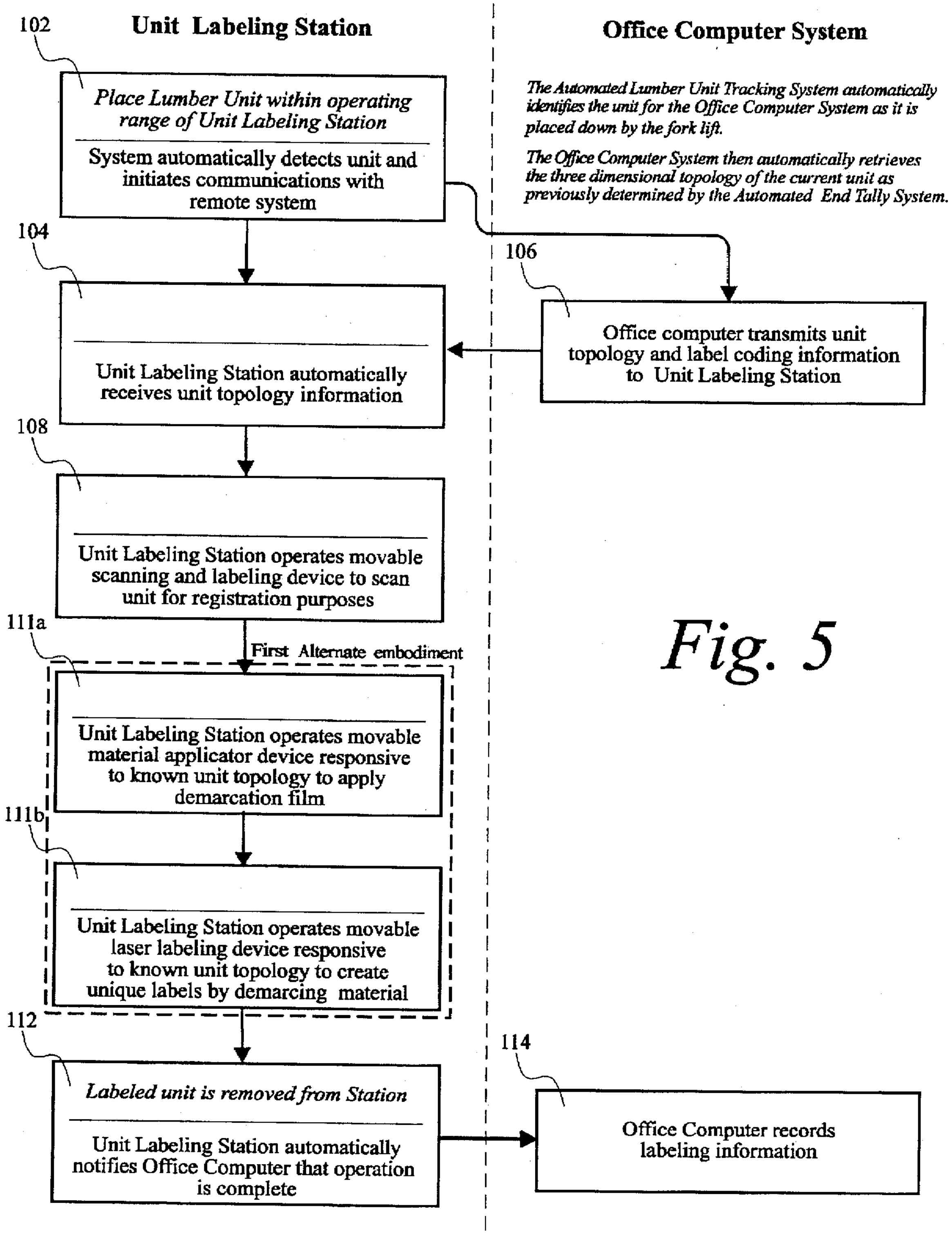
FIG. 5 is a flow diagram of the operation of the first alternate embodiment of the present invention.

As shown in FIG. 5, the first alternate embodiment operates exactly similar to the preferred embodiment with respect to steps 102, 104, 106, 108, 112 and 114. However, step 110 has been replaced by steps **111*a* and 111*b*. Specifically, in step 111*a*, the first alternate embodiment of system 1 operates material applicator 60 so that it is moved horizontally on arm 27 which is moved vertically along stand 26. In this way applicator 60 is made to transverse the entire vertical-horizontal plane which is parallel to the end surface of unit 10. During this process and in response to control signals placed onto cable 66 by system 1, applicator 60 forces material 65 to flow from reservoir 64 to nozzle 62. Upon reaching nozzle 62, material 65 is then forceably ejected outwards from nozzle 62 in the form of a vertically directed, electrostatically controlled, wedge shaped spray 68. Material 65 then contacts and adheres to the board end surfaces of unit 10. Thus, as applicator 60 is controllably moved across the end surfaces all boards, a continuous planar thin film 69 of material 65 is deposited on each end surface of each board of unit 10**.

In step **111*b*, the first alternate embodiment of system 1 operates laser labeller 80 so that it is moved horizontally on arm 27 which is moved vertically along stand 26. In this way labeller 80 is made to transverse the entire vertical-horizontal plane which is parallel to the end surface of unit 10. During this process and in response to control signals received from cable 86, laser labeller 80 concurrently emits focused laser light 84 in predetermined bar code or text patterns upon the end surfaces of each board. Thin film 69, in response to laser light 84, selectively changes color from white to black thereby effectively allowing both bar code 89*a* and text information 89*b*** to be uniquely demarcated on each end surface of each board.

SPECIFICATION OF THE SECOND ALTERNATE EMBODIMENT

Figure 6:
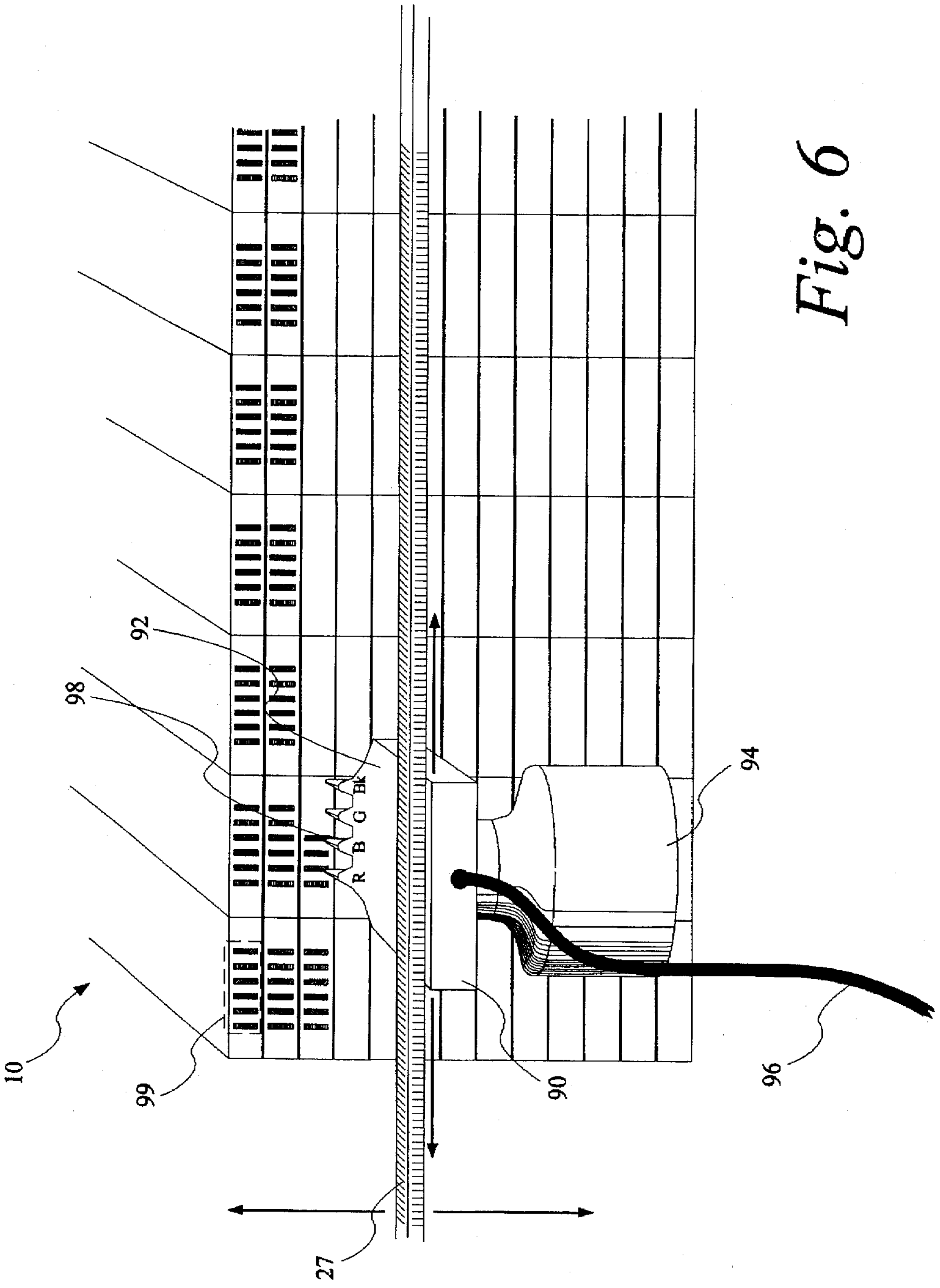
FIG. 6 is a perspective diagram of the second alternate embodiment to the scanning unit with robotic label applicator. The second alternate is depicted as an electrostatically controlled wedge shaped material applicator with multiple spray heads being controllably moved across one entire end of a bundled unit of lumber.

Referring now to FIG. 6, there is shown a second alternate embodiment to label applicator 24. Specifically, there is shown multiple material applicator with multiple spray heads 90 which is attached to horizontal arm 27 and is capable of controlled horizontal movement along arm 27 in a similar fashion to labeler 24. Applicator 90 further comprises material reservoir 94 which contains multiple materials of various optically reflective qualifies, such as paints of the colors (R)ed, (B)lue, (G)reen and (Bl)ack. Applicator 90 additionally comprises multiple electrostatically directed wedge shaped spray nozzles 92. Reservoir 94 is in fluid communication with spray nozzle 92 such that the multiple materials it contains may be forceably ejected from nozzle 92 as multiple streams such as spray 98 which then adheres to the board ends of unit 10 forming uniquely identifying patterns 99. Electrical power and control signals are provided to applicator 90 via cable 96.

OPERATION OF THE SECOND ALTERNATE EMBODIMENT

Figure 7:
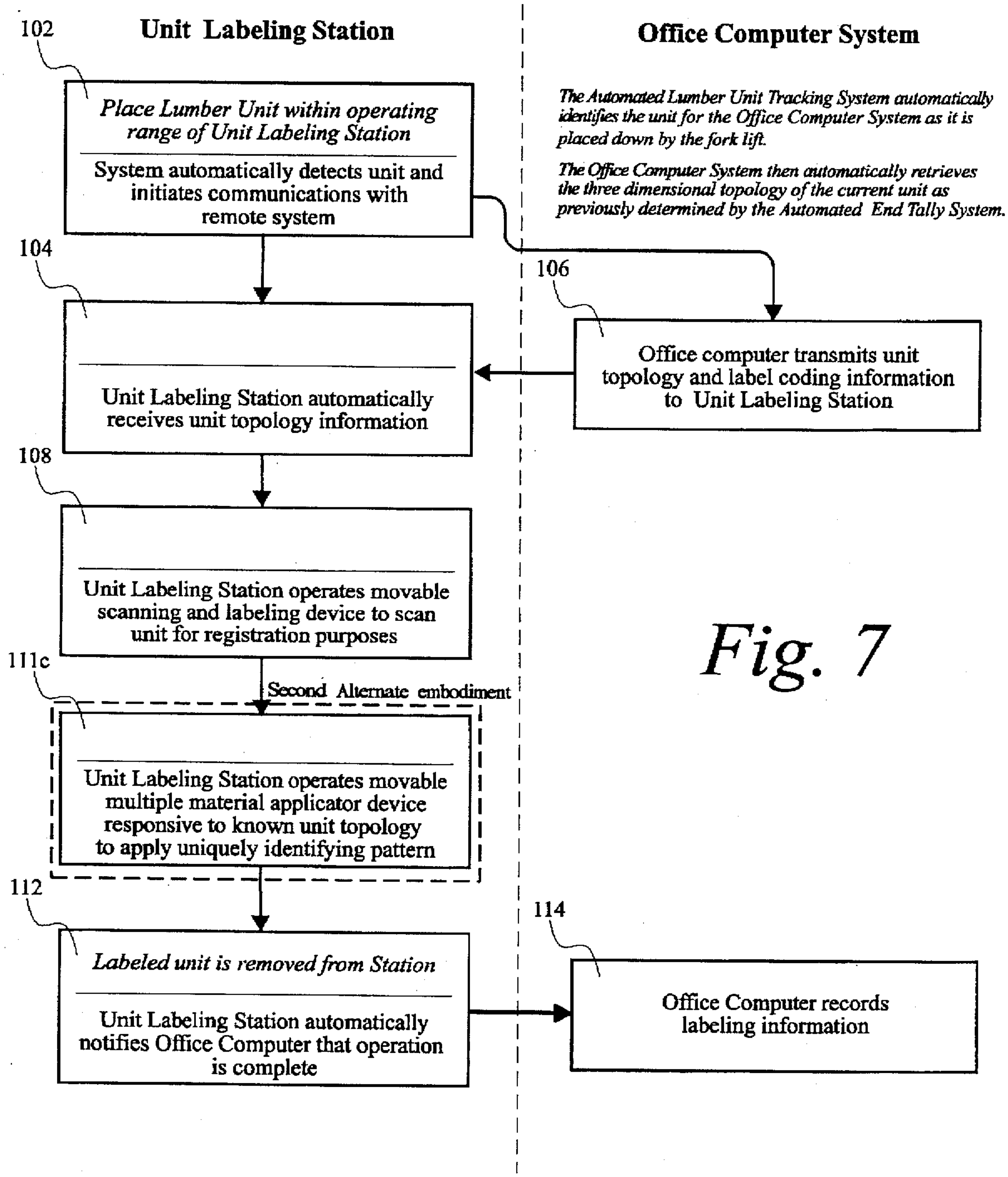
FIG. 7 is a flow diagram of the operation of the second alternate embodiment of the present invention.

As shown in FIG. 7, the second alternate embodiment operates exactly similar to the preferred embodiment with respect to steps 102, 104, 106, 108, 112 and 114. However, step 110 has been replaced by steps **111*c*. Specifically, in step 111*c*, the second alternate embodiment of system 1 operates multiple material applicator 90 so that it is moved horizontally on arm 27 which is moved vertically along stand 26. In this way applicator 90 is made to transverse the entire vertical-horizontal plane which is parallel to the end surface of unit 10. During this process and in response to control signals placed onto cable 96 by system 1, applicator 90 selectively threes various different materials from reservoir 94 through the appropriate spray nozzle of multiple nozzles 92. Upon reaching nozzles 92, the material is then forceably ejected outwards from one of nozzles 92 in the form of a vertically directed, electrostatically controlled, wedge shaped spray 98. The material then contacts and adheres to the board end surfaces of unit 10. Thus, as applicator 90 is controllably moved across the end surfaces all boards, a selective pattern of materials with different optical reflective properties is deposited on each end surface of each board of unit 10**.

CONCLUSION, RAMIFICATIONS, AND SCOPE OF INVENTION

Thus the reader will see that the Automated End Labeler System provides a system capable of labeling individual boards within a bundled unit of lumber without the aid of a human, with increased accuracy and in a minimum of time. The preferred method of operation for the system is to mimic current human based practices by robotically stapling each label to each board, while the fast alternate method suggests a new practice of optically demarcating the labels right onto the board end surfaces themselves. By implementing the first alternative method, the present invention avoids any dangers of having staples in the boards and thereby allows for the possibility of applying unique labels when the units are initially received at the yard, thus providing an office computer system with the ability to track at least the mill and cost of individual boards even as they are co-mingled with other boards to form new bundled units after processing.

While the fast alternate method first applies an optically responsive material to the end surfaces which is then optically demarcated, this is not necessary within the teachings of the present invention. For instance, the incident energy might just as easily burn the unique label directly onto the board. This burning is in fact a material (the actual board end itself), optically responding to the incident energy (a laser beam). It is also not necessary that the applied material be optically responsive in such a way that its alteration is "visible". Hence, the "demarcation" could in fact merely change the materials "non-visible" reflective properties which may not be seen by humans but could easily be read by specially created scanners such as proposed in and implied by the present invention.

Furthermore, the second alternate method taught that the applied material itself might already be of different reflective properties such that further optical demarcation would not be necessary. This would be the case where the material was in the form of various colors of paint. While these colors of paint are "visible" to the human, the applied material could be of different reflective properties which are in the "non-visible" energy range. Again, these "non-visible" materials could easily be read by specialized scanning devices.

It is important to note that the preferred embodiment demonstrated that in combination with the teachings of the prior art, a system may be created which first receives the predetermined relative coordinates and identity of the individual boards to be labeled within a unit of lumber, and then second, automatically applies unique labels in a manner similar to a human with a hand held label applicator device. Although the present invention was specified as reliant upon separate devices to predetermine the relative coordinates and identity of the individual boards, it could have just as easily incorporated these functions into a single "identifying and labeling" system. Such a system might be called an Automated End Tally and Board End Labelling System.

It is also important to note that the alternate embodiments further distinguished themselves from the human based method by obviating the requirement for "preprinted" labels. However, these alternate embodiments could take the form of "had held" devices rather than "stations", as specified in the present invention. Such devices could then be used in current human based systems to automatically either apply an optically responsive material and/or demarcate the board end surfaces, thereby creating a uniquely identifying pattern. In either case, whether implemented as "automatic stationary" or "human guided hand held" devices, the alternate embodiments offer a distinctly different type of labeling which has several inherent advantages over applied "preprinted" labels other than the elimination of the need for staples. First, these methods are better for end surfaces which are either rough in texture, to hard to be penetrated by staples, or topologically difficult to be reached with a staple based label applicator device due to size restraints. For example, it would be very difficult to staple "preprinted" labels to quarter inch bundled random length bars of metal.

While the above description contains many specifications, these should not be construed as limitations on the scope of the invention, but rather as an exemplification of preferred embodiments thereof. Many other variations are possible. It is evident from the description of the Automated End Labeler System that it has applicability beyond that of "end labeling" units of lumber. There are other industries, such as metal, which transfer their dimensional products in labeled groups. To the extent of which objects are of various distinctive qualities and yet are in some way packaged together, then there more or less exists the need to uniquely identity each object within the packaged group. One such example is of quarter inch bundles of metal bars, usually of the same alloy and diameter, but often of varying lengths. It is therefore considered that the Automated End Labeler System is in general capable of automatically and individually labeling all members of a common group of objects. Accordingly, the scope of the invention should be determined not by the embodiments illustrated, but by the appended claims and their legal equivalents.

From the foregoing detailed description of the present invention, the Automated End Labeler System, it will be apparent that the invention has a number of advantages, some of which have been described above and others of which are inherent in the invention. Also, it will be apparent that modifications can be made to the Automated End Labeler System without departing from the teachings of the invention. Accordingly, the scope of the invention is only to be limited as necessitated by the accompanying claims.

We claim:

1. An automatic means for applying a label to a first object within a group of objects in which a second object is touching said first object, based upon said first object's three dimensional coordinates, comprising:

means for remotely determining from said objects said three dimensional coordinates of said objects within said group prior to applying labels to any of said objects, and means responsive to said three dimensional coordinates for automatically applying said label to said first object.

2. The invention of claim 1 wherein said means for determining from said objects said three dimensional coordinates comprises:

means for determining end topology information relating to said objects, and means for determining said three dimensional coordinates of said objects from said end topology information.

3. The invention of claim 2 wherein said means for determining said end topology information relating to said objects comprises:

means for automatically scanning said group of objects with energy;

means for receiving reflected scan energy from said group; and means for determining from said reflected scan energy said end topology relating to said objects.

4. The invention of claim 3 wherein said objects are substantially aligned along their longitudinal axis.

5. The invention of claim 4 wherein said first object's end surface is substantially perpendicular to said longitudinal axis.

6. The invention of claim 5 wherein said objects are stacked upon each other to form said group.

7. The invention of claim 6 wherein said group of said stacked objects lies stationary with respect to said automatic means for applying said label during the entire labeling process.

8. The invention of claim 1 wherein said automatic label applying means comprises:

an extendible robotic arm for applying said label to said first object; and means responsive to said three dimensional coordinates for aligning said robotic arm with said first object.

9. The invention of claim 8 wherein said aligning means comprises:

means for controlling the horizontal movement of said robotic arm; and means for controlling the vertical movement of said robotic arm.

10. A method of automatically applying a label to a first object within a group of objects in which a second object is touching said first object, based upon said first object's three dimensional coordinates, comprising the steps of:

scanning said group of objects with energy; and receiving reflected scan energy from said group into a computer controlled apparatus; and determining from said reflected scan energy said three dimensional coordinates of said objects using said computer controlled apparatus prior to applying labels to any of said objects; and automatically applying said label to said first object in response to said three dimensional coordinates.

11. The invention of claim 10 wherein said objects are substantially aligned along their longitudinal axis.

12. The invention of claim 11 wherein said first object's end surface is substantially perpendicular to said longitudinal axis.

13. The invention of claim 12 wherein said objects are stacked upon each other to form said group.

14. The invention of claim 13 wherein said group of said stacked objects lies stationary during the entire labeling process.

15. The invention of claim 10 wherein said step of automatically applying labels further comprises the steps of:

aligning a robotic arm with said first object in accordance with said first object's said three dimensional coordinates;

extending said robotic arm to said first object in accordance with said first object's said three dimensional coordinates; and applying said label to said first object by said robotic arm.

16. The invention of claim 15 wherein said step of aligning further comprises the steps of:

controllably moving said robotic arm in a horizontal direction; and controllably moving said robotic arm in a vertical direction.

* * * * *